United States Patent [19]

Christen et al.

[11] Patent Number: 4,488,198
[45] Date of Patent: Dec. 11, 1984

[54] PROTECTIVE CIRCUIT FOR CLUTCHLESS PARALLEL GENERATING SYSTEM

[75] Inventors: Roland W. Christen; Alfred A. Deichstetter, both of Rockford, Ill.

[73] Assignee: Sundstrand Corporation, Rockford, Ill.

[21] Appl. No.: 378,644

[22] Filed: May 17, 1982

Related U.S. Application Data

[63] Continuation of Ser. No. 225,315, Jan. 15, 1981, abandoned.

[51] Int. Cl.³ .............................................. H02H 7/06
[52] U.S. Cl. ....................................... 361/20; 361/82; 361/84; 307/86; 307/20; 307/24; 322/20; 322/24; 322/25; 322/44
[58] Field of Search ...................... 361/20, 21, 82, 84, 361/78, 79, 236, 239, 240; 307/84–87, 20, 27, 24, 51, 57, 73, 75, 76; 322/44, 20, 24, 32, 29, 25

[56] References Cited

U.S. PATENT DOCUMENTS

| | | | |
|---|---|---|---|
| 2,885,569 | 5/1959 | Schuh et al. | 307/87 |
| 3,156,828 | 11/1964 | Hopper Jr. et al. | 307/57 |
| 3,539,868 | 11/1970 | Stevenson | 317/27 |
| 3,546,533 | 12/1970 | Lydick | 361/20 |
| 3,697,811 | 10/1972 | Little | 361/82 |
| 3,805,161 | 4/1974 | Bayha et al. | 361/239 X |

Primary Examiner—Patrick R. Salce
Attorney, Agent, or Firm—Harold A. Williamson; Ted E. Killingsworth; Michael B. McMurry

[57] ABSTRACT

An electrical distribution system has parallel connected generators powered by variable speed engines. Loads connected with each generator are interconnected through an electrical distribution bus. Constant speed drives have inputs connected with the engines and outputs directly connected with the generators. The connections between the constant speed drive outputs and the generators are characterized by the absence of overrunning clutches used in prior systems. An improved electrical protective circuit senses a flow of electrical power from the distribution bus to a generator, driving the generator as a motor. If the power flow to the generator is excessive, the bus tie breaker is opened disconnecting the generator from the bus.

5 Claims, 5 Drawing Figures

PROTECTIVE CIRCUIT FOR CLUTCHLESS PARALLEL GENERATING SYSTEM

This is a continuation of application Ser. No. 225,315 filed Jan. 15, 1981, not abandoned.

This invention relates to an improved electrical protective circuit for a parallel generator electrical power distribution system.

BACKGROUND OF THE INVENTION

Electrical power distribution systems in which generators are driven as auxiliary loads by variable speed engines have unique regulatory problems. An example is the electrical system for a multi-engine aircraft where each engine drives a generator. Engine speed is determined by aircraft operating conditions and may vary over a wide range. A constant speed drive interposed between each engine and generator converts a variable input shaft speed to a constant output shaft speed to drive the generator. A control circuit provides frequency and voltage regulation and interconnects the generators for division of the electrical load.

Abnormal system conditions may result in one or more generators being driven as motors by the other generators. This is undesirable as it results in a power drain, causes frequency shift in the system and may damage the constant speed drive. In a typical system, a mechanical overrunning clutch is provided between the constant speed drive output and the generator, allowing a generator to be driven as a motor with a minimum power drain and without damage to the constant speed drive. The clutch, however, adds initial cost to the system, is subject to wear requiring repair or replacement.

SUMMARY OF THE INVENTION

In accordance with the invention, an improved electrical protective circuit prevents one generator from driving another, enabling elimination of the overrunning clutch between the constant speed drive and the generator.

More particularly, a principal feature of the invention is the provision of means for sensing a flow of electrical power from the electrical distribution bus to a generator, sometimes referred to as reverse power, and means responsive to the occurrence of such flow of power for opening the bus tie breaker between the electrical distribution bus and the generator to which electrical power is flowing.

Another feature is the provision of means establishing a time delay before actuation of the bus tie breaker.

Yet a further feature is the provision, in combination with the reverse power detector, of means for detecting an underspeed condition at the input of each constant speed drive and means responsive to the constant speed drive underspeed condition to open the generator circuit breaker of the associated generator and to reclose the bus tie breaker and maintain power to the load.

Further features and advantages of the invention will readily be apparent from the following specification and from the drawings, in which.

Figure 1:
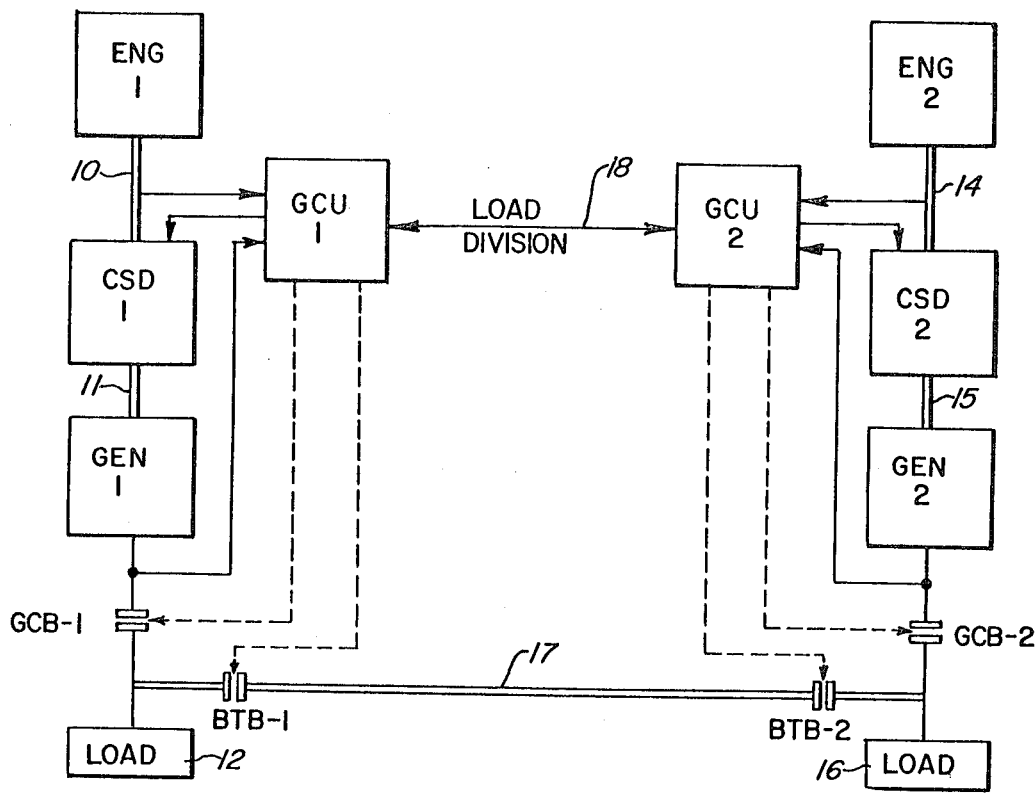
FIG. 1 is a block diagram of a multi-generator electrical distribution system illustrating the invention.

FIG. 1 illustrates the invention as embodied in a two generator system. The invention may, of course, be used with three, four or more generators. In the system of FIG. 1, an engine ENG-1 drives the input shaft 10 of constant speed drive CSD-1 which has an output shaft 11 that drives a generator GEN-1. The electrical output of GEN-1 is connected through a generator circuit breaker GCB-1 to a load 12. A second engine ENG-2 drives the input shaft 14 of constant speed drive CSD-12 which has an output shaft 15 that drives a generator GEN-2. The electrical output of GEN-2 is connected through a generator circuit breaker GCB-2 with load 16. An electrical distribution bus 17 is connected through bus tie breakers BTB-1 and BTB-2 with GEN-1, GEN-2 and loads 2 and 16. Generator control units GCU-1 and GCU-2 are provided with input information or signals including constant speed drive input shaft speed and the electrical output of the associated generator. The two generator control units are interconnected by a load division circuit 18. Outputs from the generator control units are connected with the constant speed drives to control frequency and load division, and with the generator circuit breaker and bus tie breaker contacts for paralleling the generators on start-up or disconnection the generators on shut-down or in event of a malfunction. Only those aspects of the generator control units which are directly related with the protective circuits that enable elimination of the overrunning clutches between the constant speed drives and the generators are illustrated.

Briefly, in the event of a flow of electrical power from distribution bus 17 to a generator, i.e., reverse power, the bus tie breaker between the distribution bus and such generator is opened. If, subsequently, the generator circuit breaker connected between such generator and its associated load opens, the bus tie breaker is reclosed connecting the load with the electrical distribution bus so that interruption of load operation is minimized.

Figure 2:
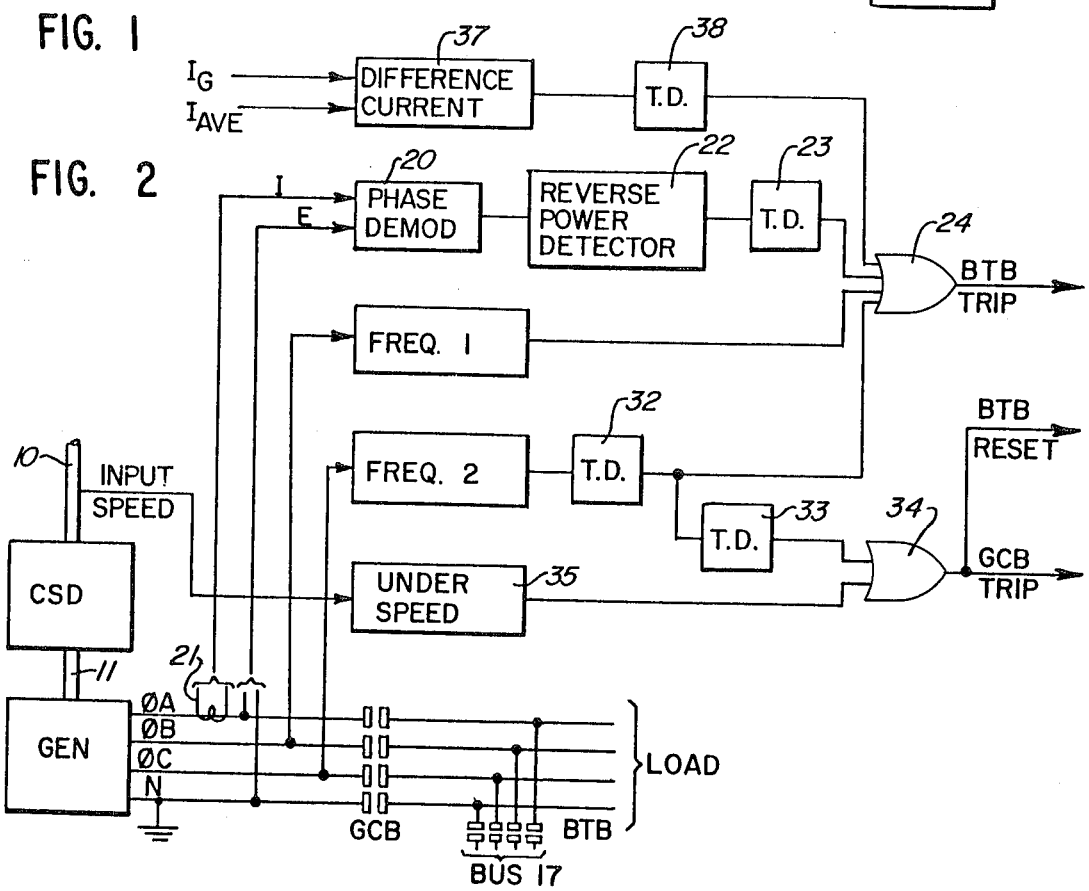
FIG. 2 is a block diagram of the electrical protective circuit.

That portion of the generator control unit related to the invention is illustrated in FIG. 2. The generator GEN is shown as having a three-phase wye-connected output with phass $\phi A$, $\phi B$, $\phi C$ and a grounded neutral N. The generator output is connected through four generator circuit breaker contacts GCB with the load, and through four bus tie breaker contacts BTB with the electrical distribution bus 17.

Electrical inputs for the generator control unit are derived from the generator output between the generator and the GCB contacts. Only those inputs pertinent to the electrical protective circuit are illustrated. Other inputs may be provided to the generator control unit and the inputs illustrated may serve other functions in the generator control unit. The point at which the electrical input signals are derived is sometimes referred to as the point of regulation or POP.

The power flow to the generator is monitored by a circuit including a phase demodulator 20 having a current input I connected with current transformer 21 and a voltage input E connected between generator terminal $\phi A$ and N. The output of phase demodulator 20 represents the power in the A phase of the generator and is connected with a reverse power detector 22 which responds to a selected level of reverse power. The output of the reverse power detector is connected through a time delay 23 with OR gate 24 which operates a trip circuit (not shown) for the associated bus tie breaker BTB.

In a preferred embodiment of the invention, the reverse power detection circuit has two reverse power detectors which respond at different levels of reverse power flow and with different time delays so that the bus tie breaker is opened more rapidly with a higher level of reverse power flow.

Figure 3:
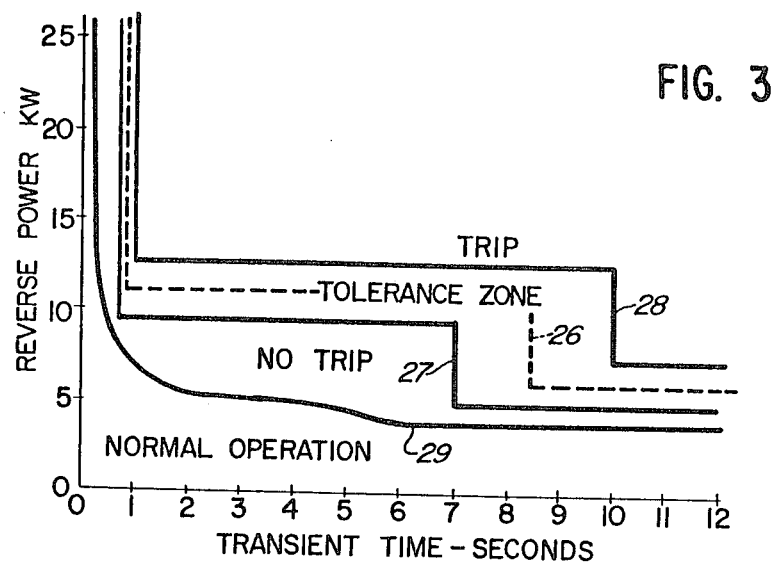
FIG. 3 is a curve representing the bus tie breaker trip characteristic as a function of the amplitude and duration of reverse power, illustrating operation of the protective circuit.

The operation of the circuit is illustrated graphically in FIG. 3 where the broken line 26 represents the nominal trip characteristic as a function of reverse power level and transient time. Considered quantitatively, the curve represents a system in which the bus tie breakers are opened after a time delay of 0.9 seconds with a reverse power flow in excess of 11 KW and after a time delay of 8.5 seconds with a reverse power flow in excess of 6.2 KW. The solid lines 27, 28 define a zone of operation determined by worst case tolerances of the circuit components. In the area below line 27, the bus tie breakers are not opened. Curve 29 defines normal reverse power flow in terms of power level and transient time duration for typical circuit conditions.

Other system conditions are monitored, much as in prior systems, providing protection which complements that of the reverse power detector and which affords a back-up in the event of a failure in the reverse power detector circuit. During the course of the following description, specific system conditions and operating characteristics will be described. These conditions and characteristics have been found suitable in a specific aircraft system. Modifications and variations will be apparent to those skilled in the art and the specific figures given are not critical.

Generators connected in parallel operate at the same frequency except during transient conditions. Normally in an aircraft electrical system the frequency is 400 Hertz. If a fault occurs that causes one of the generators to operate at a higher frequency, the other generators are motored to follow it. First and second overfrequency circuits FREQ-1 and FREQ-2 protect against excessive overfrequency. The circuit FREQ-1 which is connected with phase ϕB, detects a system frequency of 440 Hertz and has an output connected directly with OR gate 24 to open the bus tie breaker BTB.

The second overfrequency circuit FREQ-2 is connected with phase ϕC and responds to a frequency of 430 Hertz. A time delay circuit 32 connected between the output of FREQ-2 and OR gate 24 delays opening of the bus tie breaker by 1.5 seconds. A further time delay 33 is connected between the output of time delay 32 and OR gate 34 affording an additional half second time delay before opening the generator circuit breaker GCB of the association generator. If the generator which trips the bus tie breaker is not the faulty generator, its speed will drop as soon as the bus tie breaker opens and the generator circuit breaker will not be tripped. Thus, the generator continues to supply its associated load. If, however, the generator for which the bus tie breaker opens is faulty, the frequency remains high, the generator circuit breaker opens and the bus tie breaker is reset or closed, reestablishing power to the associated load from the distribution bus 17.

The speed of input shaft 10 for the constant speed drive CSD is measured, as by a proximity sensor and a gear on the shaft, not shown. An underspeed detector 35 connected with the input shaft speed sensor, has an output connected with OR gate 34 to open the generator circuit breaker in the event the speed falls below engine idle speed. This circuit comes into play during engine shut-down or in the event of an engine failure.

A difference current detector 37 compares the generator current with an average of the currents of the other generators, or in a two generator system with the current of the other generator. If the difference exceeds a selected level, the bus tie braker BTB is opened following a suitable delay afforded by time delay 38. This circuit provides back-up and will open the bus tie breaker before damage to the system in the event of a reverse power detector failure.

Figure 4:
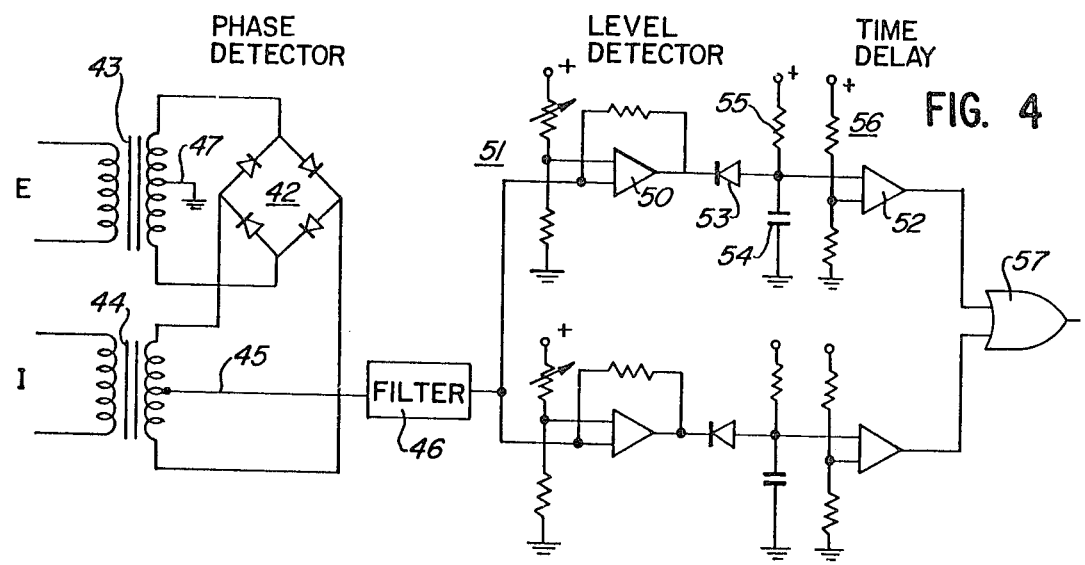
FIG. 4 is a schematic diagram of the reverse power detection circuit.

FIG. 4 illustrates a circuit for two level detection of a reverse power flow. The signal representing power is established by a phase sensitive detector circuit utilizing diode bridge 42. The phase voltage E is connected with the primary winding of coupling transformer 43 which has a center tapped secondary connected across one pair of terminals of the diode bridge 42. The current input to the phase detector is connected from current transformer 21 through coupling transformer 44 having a secondary winding connected across the other pair of terminals of diode bridge 42. An output signal representing $EICOS\theta$, where $\theta$ is the power factor for the measured phase, is derived from the center tap of the secondary winding of the current coupling transformer 44. The power signal is connected through a low pass smoothing filter 46 with a pair of level detector circuits.

The center tap 47 for the secondary winding of the voltage coupling transformer 43 is returned to a ground reference. If it is desired to measure power flow in both directions, the phase detector may be biased by applying a suitable DC voltage to the voltage transformer center tap 47.

The level detectors are identical and only one will be described. The power signal from filter 46 is applied to one input of an operation a lifier comparator 50 having the other input terminal returned to a voltage divider 51. In the absence of reverse power, the output of amplifier 50 is low, grounding the input of time delay amplifier 52 through diode 53. In the event reverse power exceeds the level set by voltage divider 51, the output of amplifier 50 goes high and capacitor 54 charges through resistor 55. When the voltage across the capacitor reaches a level established by voltage divider 56 to which the other input of amplifier 52 is connected, the output of amplifier 52 goes high providing an input to OR gate 57 to trip the bus tie breaker BTB. The second level detector is similarly constructed and opeates in the same manner. The reverse power levels and time delay are set by appropriate component selection.

Figure 5:
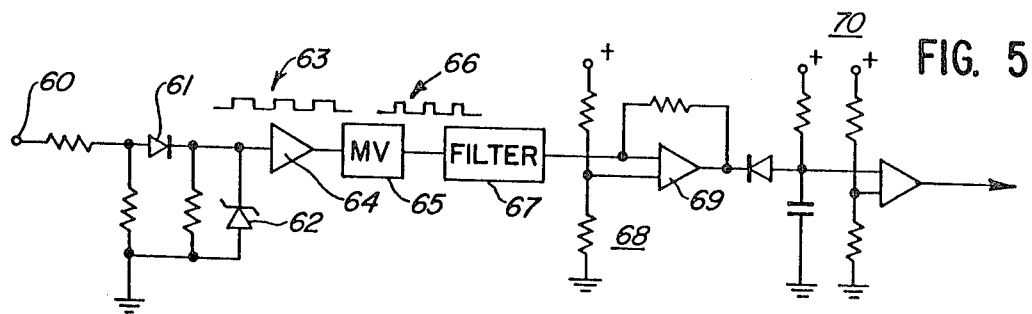
FIG. 5 is a schematic diagram of a frequency or speed detection circuit.

The circuit of FIG. 5 may be used as the frequency or underspeed detector. Input terminal 60 has connected thereto a signal which may be a sine wave from a generator or a similar signal from the output of a proximity sensor or other speed measuring transducer. The positive half cycle of the input signal is passed through diode 61 to a clipping circuit utilizing Zener diode 62. The resulting square were 63 signal is connected through amplifier 64 with a multivibrator 65 which has an output of a series of pulses 66 of fixed amplitude and uniform time duration, with a repetition rate which is a function of the frequency of the input signal. Pulses 66 are coupled through filter 67 which smooths the pulses and has a DC output at a level proportional to the pulse repetition rate or generator frequency. In the frequency detector, when the output of filter 67 exceeds the bias established by voltage divider 68 the output of comparator 69 goes high initiating the operation of time delay circuit 70. The output of the time delay circuit actuates the trip circuits as illustrated in FIG. 2. For the 440 Hertz detector, the time delay circuit is omitted. With the underspeed detector 35, the output of comparator 69 goes high when the DC voltage from filter 67 drops below the reference level.

We claim:

1. In a parallel connected, multi-generator electrical distribution system with a generator circuit breaker connecting each generator with a load and with an electrical distribution bus interconnecting the loads through series connected bus tie breakers, one for each generator, in which each generator is driven from a variable speed engine through a constant speed drive having an input connected with said variable speed engine, said constant speed drive having an output with a direct mechanical connection to the generator, the generator operating at a constant speed with variation of the engine speed and in which means are provided controlling each constant speed drive to divide the electrical load between generators, and characterized by the absence of a mechanical overruning clutch between each constant speed drive output and the associated generator, an improved electrical protective circuit to prevent one generator from driving another as a motor, comprising:
   means for sensing a flow of electrical power from the electrical distribution bus to a generator, including:
   first means for sensing the flow of electrical power from said distribution bus to the generator and responsive to a first power level;
   second means for sensing the flow of electrical power from said distribution bus to the generator and responsive to a second power level, said second power level being greater than said first power level;
   means responsive to said first power sensing means providing a time delay between sensing of such flow of power and opening of said bus tie breaker; and
   second time delay means responsive to said second power sensing means providing a time delay between sensing of such flow of power and opening of said bus tie breaker, the time delay of said second time delay means being less than that of the first time delay means,
   means responsive to the first and second time delay means for opening the bus tie breaker more rapidly when a higher level of said electrical power is flowing between the electrical distribution bus and the generator to isolate both the generator and the load from the electrical distribution bus.

2. The electrical protective circuit of claim 1 including
   means for detecting an underspeed condition at the input of each constant speed drive; and
   means responsive to the constant speed drive underspeed condition to open the generator circuit breaker of the associated generator and to reclose the bus tie breaker.

3. The electrical protective circuit of claim 1 in which said means for sensing a flow of electrical power from the electrical distribution bus to a generator includes:
   a phase demodulator having a voltage input connected with the generator output, a current input connected with the generator output and an output representing power; and
   a level detector connected with the output of the phase demodulator for opening the bus tie breaker when the power flowing from the distribution bus to the generator exceeds a selected level.

4. The electrical protective circuit of claim 5 for a three-phase wye-connected generator in which the voltage input is connected across one phase of the generator output and the current input is connected in series with said one phase of the generator output.

5. The electrical system of claim 1 including
   means for detecting a malfunction of the generator; and
   means responsive to such malfunction to open the associated generator circuit breaker and to reclose the associated bus tie breaker whereby energization of the associated load is maintained.

* * * * *